United States Patent
Chang

(10) Patent No.: US 8,031,953 B2
(45) Date of Patent: Oct. 4, 2011

(54) METHOD AND DEVICE FOR ENCODING IMAGE DATA WITH A PREDETERMINED COMPRESSION RATE IN ONE PASS

(75) Inventor: Fang-Chen Chang, Tainan County (TW)

(73) Assignee: Himax Technologies Limited, Tainan County (TW)

( * ) Notice: Subject to any disclaimer, the term of this patent is extended or adjusted under 35 U.S.C. 154(b) by 1020 days.

(21) Appl. No.: 11/874,331

(22) Filed: Oct. 18, 2007

(65) Prior Publication Data
US 2009/0103820 A1    Apr. 23, 2009

(51) Int. Cl.
*G06K 9/46* (2006.01)
(52) U.S. Cl. .......... 382/237; 341/56; 345/596; 358/3.06
(58) Field of Classification Search .................. 382/237; 341/56; 345/596; 358/3.06
See application file for complete search history.

(56) References Cited

U.S. PATENT DOCUMENTS

| | | | | |
|---|---|---|---|---|
| 4,862,167 A | * | 8/1989 | Copeland, III | 341/107 |
| 5,781,134 A | * | 7/1998 | Son | 341/67 |
| 6,823,069 B1 | * | 11/2004 | Kitajima et al. | 380/44 |

* cited by examiner

*Primary Examiner* — Bhavesh Mehta
*Assistant Examiner* — Eueng-Nan Yeh
(74) *Attorney, Agent, or Firm* — Thomas|Kayden

(57) ABSTRACT

An encoding method to encode image data comprising a sequence of blocks with a predetermined compression rate in one pass is disclosed. The blocks are divided into two sets, a first set and a second set. The blocks in the first set are encoded within the sum of an available bit length and a predetermined lending bit length. The blocks are encoded in the second set within the available bit length. A lending bit length is updated when the current bit length is larger than the available bit length. The left bit length is updated when the current bit length is not larger than the available bit length. The left bit length and the lending bit length are adjusted when the current block is in the second set, the lending bit length is positive and the left bit length is larger than a predetermined threshold.

21 Claims, 2 Drawing Sheets

METHOD AND DEVICE FOR ENCODING IMAGE DATA WITH A PREDETERMINED COMPRESSION RATE IN ONE PASS

BACKGROUND OF THE INVENTION

1. Field of the Invention

The present invention relates to data compression, and in particular relates to devices and methods of encoding image data.

2. Description of the Related Art

The rapid growth of digital imaging applications, including desktop publishing, multimedia, teleconferencing, and high-definition television (HDTV) has increased the need for efficient and standardized image compression techniques. Without image compression, the transmission of images would require an unacceptable bandwidth for many applications. As a result, methods of compressing images have been the subject of numerous research publications. Image compression schemes convert an image consisting of a two-dimensional array of pixels into a sequence of bits which are transmitted over a communication link. Each pixel represents the intensity of the image at a particular location therein. The transmission link may be an ordinary telephone line.

Consider an image comprising a gray-scale representation of a photograph at a resolution of 1000×1000 lines. Each pixel typically consists of 8 bits which are used to encode 256 possible intensity levels at the corresponding point on the photograph. Hence, without compression, transmission of the photograph requires that 8 million bits be sent over the communication link. A typical telephone line is capable of transmitting about 9600 bits per second; hence the picture transmission would require more than 10 minutes. Transmission times of this magnitude are unacceptable.

As a result, image compression systems are needed to reduce transmission time. It is also apparent to those skilled in the art that image compression systems may also be advantageously employed in image storage systems to reduce the amount of memory needed to store one or more images.

However, under a fixed compression system, an area of the image data may be distorted due to fixed compression rates. Specifically, the actual compression rates of different regions in the same image data are different because of different region contents. The actual compression rates of the regions with smooth contents are higher, and on the other hand, the actual compression rates of the regions with complex contents are lower. To achieve the best compression quality, an encoder can reserve some bits from first encountered smooth regions and utilize the saved bits for encoding latter complex regions. Nevertheless, one-pass encoding is normally adopted for encode processing for consistency and simplification. With one-pass encoding, image data passes through the encoder once, and the fixed compression rate is applied as the content is encountered. Thus, when a complex region is encountered before any smooth region is encountered, there are no saved bits for encoding the complex region and the complex region is encoded with the fixed compression rate. Consequently, it may cause distortion of the complex region of the image data.

BRIEF SUMMARY OF INVENTION

A detailed description is given in the following embodiments with reference to the accompanying drawings.

An encoding method to encode image data comprising a sequence of blocks with a predetermined compression rate in one pass is disclosed. The blocks are divided into two sets, a first set and a second set and the first set is followed by the second set. A current block is one of the blocks and the encoded current block comprises a current bit length. A lending bit length and a left bit length both are zero at the start of encoding. The encoding method comprises the steps as follows. The blocks in the first set are encoded within the sum of an available bit length and a predetermined lending bit length, in which the available bit length is calculated according to the predetermined compression rate and the left bit length. The blocks are encoded in the second set within the available bit length. The lending bit length is updated according to the current bit length and the available bit length after encoding the current block when the current block is in the first set and the current bit length is larger than the available bit length. The left bit length is updated when the current block is in the first set and the current bit length is not larger than the available bit length. The left bit length is updated when the current block is in the second set. The left bit length is adjusted according to a compensating bit length after calculating the left bit length when the current block is in the second set, the lending bit length is positive and the left bit length is larger than a predetermined threshold. The lending bit length is adjusted according to the compensating bit length after updating the left bit length.

An encoding method to encode image data comprising a sequence of blocks is disclosed. The blocks are divided into two sets, a first set and a second set and the first set is followed by the second set. A first block is one of the first set and a second block is one of the second set. Each of the blocks comprises an available encoded bit length (k+left_len) according to a predetermined compression rate. The encoding method comprises the steps as follows. A first allowable bit length for the first block is determined. The maximum bit length of the first allowable bit length is greater than the available encoded bit length by a first predetermined bit length (k/8). The first block is encoded and a lending bit length is recorded by subtracting the available encoded bit length from the bit length of the encoded first block or a left bit length is recorded by subtracting the bit length of the encoded first block from the available encoded bit length. A second allowable bit length for the second block is determined. The maximum bit length of the second allowable bit length is equal to the available encoded bit length (k+left_len). The second block is encoded and the left bit length is updated when the lending bit length is positive and the left bit length is larger than a second predetermined bit length (k/4).

An encoding system to encode image data comprising a sequence of blocks is disclosed. The blocks are divided into two sets, a first set and a second set and the first set is followed by the second set. A first block is one of the first set and a second block is one of the second set. Each of the blocks comprises an available encoded bit length (k+left_len) according to a predetermined compression rate. The encoding system comprises an input unit, an encoder and an output unit. The input unit is configured to receive the blocks. The encoder is configured to determine a first allowable bit length for the first block and encode the first block, and record lending bit length by subtracting the available encoded bit length from the bit length of the encoded first block or record a left bit length by subtracting the bit length of the encoded first block from the available encoded bit length. The encoder also determines a second allowable bit length for the second block, encodes the second block and updates the left bit length when the lending bit length is positive and the left bit length is larger than a second predetermined bit length (k/4). The maximum bit length of the first allowable bit length is greater than the available encoded bit length by a first predetermined bit length(k/8) and the maximum bit length of the second allowable bit length is equal to the available encoded bit length (k+left_len). The output unit is configured to output the encoded result as a bit stream.

BRIEF DESCRIPTION OF DRAWINGS

The present invention can be more fully understood by reading the subsequent detailed description and examples with references made to the accompanying drawings, wherein.

DETAILED DESCRIPTION OF INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
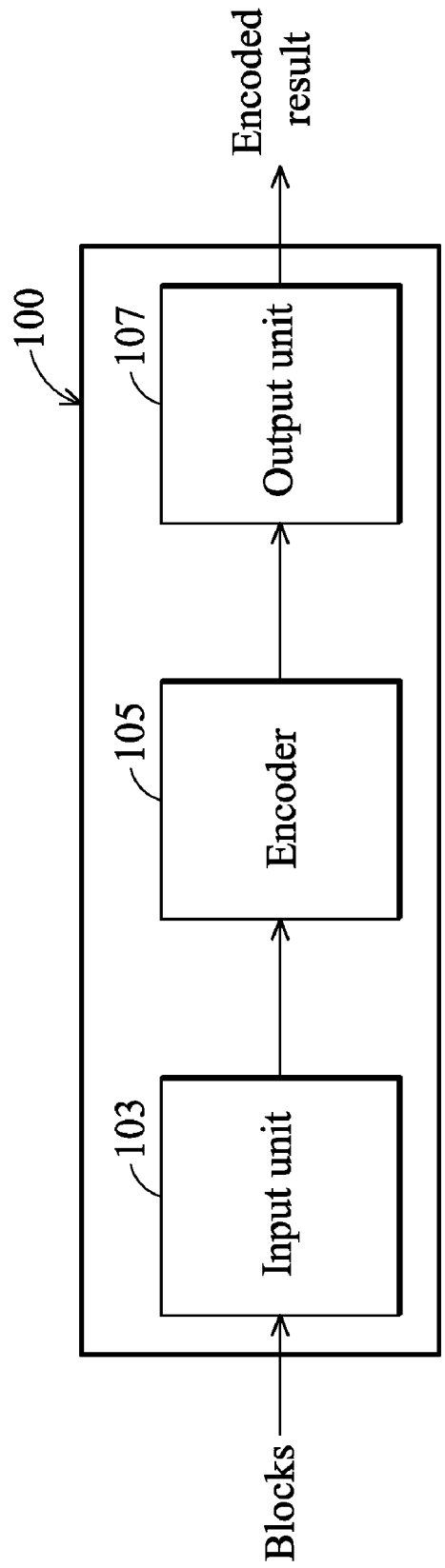
FIG. 1 is a diagram illustrating the encoding device in an embodiment of the invention.

FIG. 1 is a diagram illustrating the encoding device in an embodiment of the invention. Encoding device 100 comprises an input unit 103, an encoder 105, and an output unit 107. Encoding device 100 encodes image data IMG with a predetermined compression rate in one pass. Image data IMG comprises a sequence of blocks. Thus encoding device 100 receives the blocks sequentially. The blocks are divided in to two sets, a first set and a second set. In the embodiment, the blocks in the first set are the one-quarter of the blocks, and the blocks in the second set are the remaining three-quarters of the blocks.

Input unit 103 receives the sequence of blocks. Encoder 105 encodes the blocks in the first set within the sum of an available bit length and a predetermined lending bit length, in which the maximal length of the encoded data are limited under the sum of the available bit length and the predetermined lending bit length. The available bit length is calculated according to the predetermined compression rate and a left bit length left_len. Because the left bit length is updated after encoding each block, the available bit length is adjusted for each block. In the embodiment, the available bit length is the sum of the left bit length left_len and a default bit length k which is calculated according the predetermined compression rate. In the embodiment, the predetermined lending bit length is k/8. The left bit length left_len and a lending bit length lend_len are both zero at the start of encoding. Encoder 105 encodes the blocks in the second set within the available bit length left_len+k.

For each block, a current block B is one of the blocks of the sequence received by encoding device 100 and a current bit length cur_len is the data length of the encoded current block B. After encoding current block B, encoder 105 updates the lending bit length lend_len according to the current bit cur_len and the available bit length left_len+k when the current block B is in the first set and the current bit length is larger than the available bit length. Please note that, only if current block B is in the first set, the current bit length may be larger than the available bit length. In the embodiment, the lending bit length lend_len is updated by the difference between the current bit length cur_len and the available bit length left_len+k, which is lend_len=lend_len+cur_len−(left_len+k) when the current block B is in the first set and cur_len>left_len+k. Otherwise, encoder 105 updates the left bit length left_len when the current block B is in the first set and the current bit length cur_len is not larger than the available bit length left_len+k. In the embodiment, the left bit length is updated by the difference between the available bit length left_len+k and the current bit length cur_len, which is left_len=(left_len+k)−cur_len when the current block B is in the first set and cur_len≦left_len+k. Further, encoder 150 updates the left bit length left_len when the current block B is in the second set. Please note that, the current bit length must be smaller than the available bit length. In the embodiment, the left bit length is updated by the difference between the available bit length left_len+k and the current bit length cur_len, which is left_len=(left_len+k)−cur_len.

Further, when current block B is in the second set, encoder 150 adjusts the left bit length left_len according to a compensating bit length after updating the left bit length when the lending bit length lend_len is positive and the left bit length left_len is larger than a predetermined threshold. In the embodiment, the predetermined threshold is k/4 and the left bit length is adjusted by subtracting the compensating bit length. The compensating bit length is calculated according to the lending bit length. When the lending bit length lend_len is larger than a predetermined number, the compensating bit length is determined to be the predetermined number. In the embodiment, the predetermined number is k/8. Therefore, the left bit length left_len is changed by left_len=left_len_k/8 when lend_len>k/8 in the embodiment. Otherwise, when the lending bit length lend_len is not larger than the predetermined number, the compensating bit length is determined to be the lending bit length lend_len. Thus, in the embodiment, the left bit length left_len is adjusted by left_len=left_len-lend_bit when lend_len 5 k/8. Then, encoder 150 adjusts the lending bit length lend_len according to the compensating bit length after adjusting the left bit length. The lending bit length lend_bit is adjusted by subtracting the compensating bit. Thus, in the embodiment, the lending bit length lend_len is adjusted by lend_len=lend_len_k/8 when lend_len>k/8 and by lend_len=0 when lend_len≦k/8. Please note that, the predetermined threshold is larger than the predetermined number. Finally, output unit 107 outputs the encoded result as a bit stream.

Figure 2:
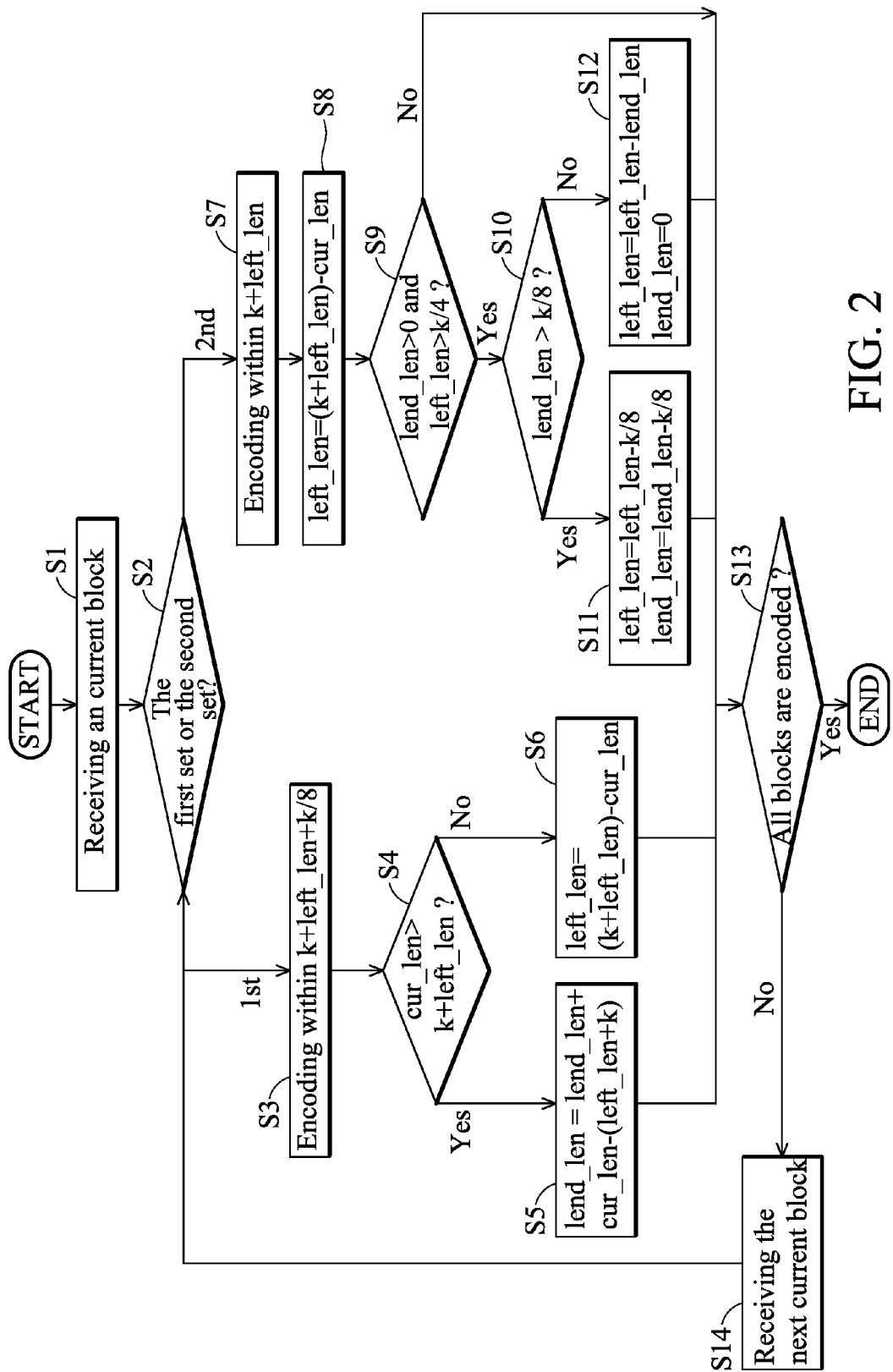
FIG. 2 is a flowchart illustrating the encoding method in an embodiment of the invention.

FIG. 2 is a flowchart illustrating the encoding method in an embodiment of the invention. A current block is received by encoding device 100. (S1) Both, the left bit length and the lending bit length are zero at the start of encoding. First, whether the current block is in the first set or in the second set is determined. (S2) When the current block is in the first set, the current block is encoded within k+left_len+k/8 by encoder 105. (S3) After encoding the current block in the first set, whether the current bit length cur_len is larger than the available bit length left_len+k is determined. (S4) The lending bit length is updated by lend_len=lend_len+cur_len−(left_len+k) when cur_len>left_len+k. (S5) Otherwise, the left bit length is updated by left_len=(left_len+k)−cur_len when cur_len≦left_len+k. (S6)

If the current block is in the second set, the current block is encoded within k+left_len. (S7) Next, because the current bit length must not be larger than the available bit length when the current block is in the second set, the left bit length is updated by left_len=(left_len+k)−cur_len. (S8) Then, whether the lending bit length lend_len is positive and the left bit length left_len is larger than the predetermined threshold k/4 is determined. (S9) When lend_len>0 and left_len>k/4, whether the lending bit length lend_len is larger than the predetermined number k/8 is determined. (S10) When lend_len>k/8, the compensating bit length is determined to be the predetermined number k/8 and the left bit length is adjusted by left_len=left_len_k/8. The lending bit length is accordingly adjusted by lend_len=lend_len_k/8. (S11) Otherwise, the compensating bit length is determined to be the lending bit length and the left bit length is adjusted by left_len=left_len_lend_len. The lending bit length is accordingly adjusted by lend_len=0. (S12) When lend_len≦0 or left_len≦k/4, no bit length is adjusted and updated. After the current block is encoded and the said bit lengths are updated, a next block is received by encoding device 100, and the aforementioned encoding process is repeated until the sequence of the blocks are encoded. (S13 and S14)

Accordingly, the disclosed encoding device and method may offer an adaptable bit length for encoding different blocks. When a complex region occurs at the start, the disclosed bit control device and method may increase the bit length for encoding the complex region to decrease the bit rate based on an average of encoding the following smooth regions by a shorter bit length. Therefore, avoiding any distortion to occur in the complex region.

Systems and methods, or certain aspects or portions thereof, may take the form of a program code (i.e., instructions) embodied in tangible media, such as floppy diskettes, CD-ROMS, hard drives, or any other machine-readable storage medium, wherein, when the program code is loaded into and executed by a machine, such as a computer system and the like, the machine becomes an apparatus for practicing the invention. The disclosed methods and apparatuses may also be embodied in the form of a program code transmitted over some transmission medium, such as electrical wiring or cabling, through fiber optics, or via any other form of transmission, wherein, when the program code is received and loaded into and executed by a machine, such as a computer or an optical storage device, the machine becomes an apparatus for practicing the invention. When implemented on a general-purpose processor, the program code combines with the processor to provide a unique apparatus that operates analogously to specific logic circuits.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An encoding method to encode image data comprising a sequence of blocks with a predetermined compression rate in one pass, wherein the blocks are divided into two sets, a first set and a second set and the first set is followed by the second set, a current block is one of the blocks and the encoded current block comprises a current bit length and a lending bit length and a left bit length are both zero at the start of encoding, the encoding method comprising the steps of:
    encoding the blocks in the first set within the sum of an available bit length and a predetermined lending bit length, wherein the available bit length is calculated according to the predetermined compression rate and the left bit length;
    encoding the blocks in the second set within the available bit length;
    updating the lending bit length according to the current bit length and the available bit length after encoding the current block when the current block is in the first set and the current bit length is larger than the available bit length;
    updating the left bit length when the current block is the first set and the current bit length is not larger than the available bit length;
    updating the left bit length when the current block is the second set; and
    adjusting the left bit length according to a compensating bit length and adjusting the lending bit length according to the compensating bit length after performing calculations on the left bit length when the current block is in the second set, the lending bit length is positive and the left bit length is larger than a predetermined threshold.

2. The encoding method as claimed in claim 1, wherein the available bit length is the sum of the left bit length and a default bit length calculated according to the predetermined compression rate.

3. The encoding method as claimed in claim 1, wherein the lending bit length is updated by the difference between the current bit length and the available bit length.

4. The encoding method as claimed in claim 1, wherein the left bit length is updated by the difference between the available bit length and the current bit length.

5. The encoding method as claimed in claim 1, wherein the compensating bit length is calculated according to the lending bit length.

6. The encoding method as claimed in claim 5, wherein the compensating bit length is determined to be a predetermined number when the lending bit is larger than the predetermined number.

7. The encoding method as claimed in claim 5, wherein the compensating bit length is determined to be the lending bit length when the lending bit is not larger than the predetermined number.

8. The encoding method as claimed in claim 1, wherein the left bit length is adjusted by subtracting the compensating bit length and the lending bit length is adjusted by subtracting the compensating bit length.

9. The encoding method as claimed in claim 1, wherein the blocks in the first sets are the first one-quarter of the block, and the blocks in the second sets are the remaining three-quarters of the block.

10. The encoding method as claimed in claim 1, wherein the predetermined threshold is larger than the predetermined number.

11. An encoding method to encode image data comprising a sequence of blocks, wherein the blocks are divided into two sets, a first set and a second set and the first set is followed by the second set, a first block is one of the first set and a second block is one of the second set, each of the blocks comprises an available encoded bit length according to a predetermined compression rate, the encoding method comprising the steps of:
    determining a first allowable bit length for the first block, wherein the maximum bit length of the first allowable bit length is greater than the available encoded bit length by a first predetermined bit length;
    encoding the first block and recording a lending bit length by subtracting the available encoded bit length from the bit length of the encoded first block or recording a left bit length by subtracting the bit length of the encoded first block from the available encoded bit length;
    determining a second allowable bit length for the second block, wherein the maximum bit length of the second allowable bit length is equal to the available encoded bit length; and
    encoding the second block and updating the left bit length when the lending bit length is positive and the left bit length is larger than a second predetermined bit length.

12. The encoding method as claimed in claim 11, wherein the available bit length is the sum of the left bit length and a default bit length calculated according to the predetermined compression rate.

13. The encoding method as claimed in claim 11, wherein the left bit length is updated according to a compensating bit length.

14. The encoding method as claimed in claim 13, wherein the compensating bit length is calculated according to the lending bit length.

15. The encoding method as claimed in claim 14, wherein the compensating bit length is determined to be a predetermined number when the lending bit is larger than the predetermined number.

16. The encoding method as claimed in claim 14, wherein the compensating bit length is determined to be the lending bit length when the lending bit is not larger than the predetermined number.

17. The encoding method as claimed in claim 11, wherein the left bit length is updated by subtracting the compensating bit length.

18. The encoding method as claimed in claim 11, wherein the blocks in the first set are the first one-quarter of the block, and the blocks in the second set are the remaining three-quarters of the block.

19. The encoding method as claimed in claim 11, wherein the predetermined threshold is larger than the predetermined number.

20. An encoding system to encode image data comprising a sequence of blocks, wherein the blocks are divided into two sets, a first set and a second set and the first set is followed by the second set, a first block is one of the first set and a second block is one of the second set, each of the blocks comprises an available encoded bit length according to a predetermined compression rate, the encoding system comprising:

an input unit configured to receive the blocks;

a non-transitory machine-readable medium encoded with a program code;

a machine loading and executing the program code to act as an encoder configured to determine a first allowable bit length for the first block and encode the first block, and record lending bit length by subtracting the available encoded bit length from the bit length of the encoded first block or record a left bit length by subtracting the bit length of the encoded first block from the available encoded bit length, to determine a second allowable bit length for the second block, encode the second block and update the left bit length when the lending bit length is positive and the left bit length is larger than a second predetermined bit length, wherein the maximum bit length of the first allowable bit length is greater than the available encoded bit length by a first predetermined bit length and the maximum bit length of the second allowable bit length is equal to the available encoded bit length; and an output unit configured to output the encoded result as a bit stream.

21. A non-transitory machine-readable medium encoded with a program code, the program code executed by the machine to implement an encoding system to encode image data comprising a sequence of blocks, wherein the blocks are divided into two sets, a first set and a second set and the first set is followed by the second set, a first block is one of the first set and a second block is one of the second set, each of the blocks comprises an available encoded bit length according to a predetermined compression rate, the encoding system comprising:

an input unit configured to receive the blocks;

an encoder configured to determine a first allowable bit length for the first block and encode the first block, and record lending bit length by subtracting the available encoded bit length from the bit length of the encoded first block or record a left bit length by subtracting the bit length of the encoded first block from the available encoded bit length, to determine a second allowable bit length for the second block, encode the second block and update the left bit length when the lending bit length is positive and the left bit length is larger than a second predetermined bit length, wherein the maximum bit length of the first allowable bit length is greater than the available encoded bit length by a first predetermined bit length and the maximum bit length of the second allowable bit length is equal to the available encoded bit length; and an output unit configured to output the encoded result as a bit stream.

* * * * *